Oct. 21, 1969     P. GAUDLITZ     3,473,292

TYING APPARATUS FOR SAUSAGE CASINGS

Filed Feb. 17, 1966     3 Sheets-Sheet 1

INVENTOR
PAUL GAUDLITZ
BY
ATTORNEY

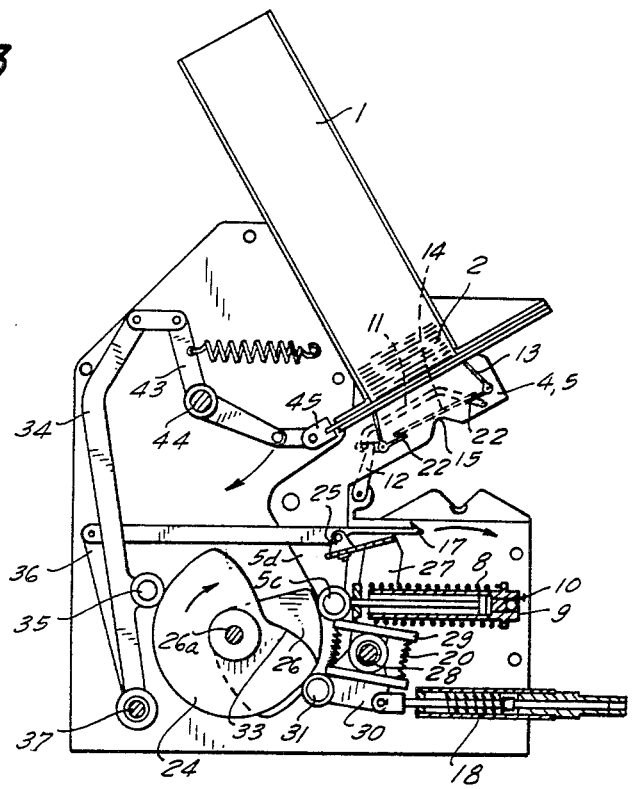
FIG. 3
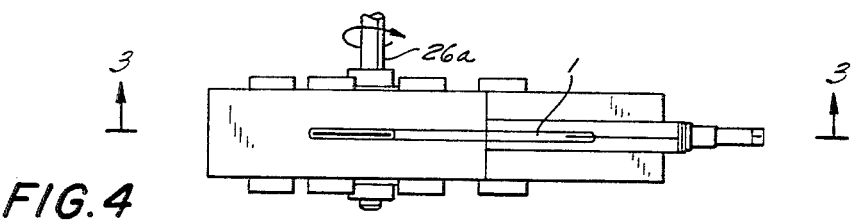
FIG. 4
FIG. 5

3,473,292
TYING APPARATUS FOR SAUSAGE CASINGS
Paul Gaudlitz, Fuhlsbuttelerweg 30,
Hamburg-Niendorf, Germany
Filed Feb. 17, 1966, Ser. No. 528,273
Claims priority, application Germany, Feb. 19, 1965,
G 42,884
Int. Cl. B65f 61/14; B65d 33/16
U.S. Cl. 53—135                                                        12 Claims

ABSTRACT OF THE DISCLOSURE

An endless clip is placed in bent condition on a portion of a sausage casing. A needle is moved in a forward stroke through the clip, and draws an end portion of the same through the central opening of the clip so that a sliding loop constricts the sausage casing and can be used for hanging the sausage.

---

The present invention relates to a tying apparatus for tying and thereby closing containers, and more particularly to apparatus for tying a constricted portion of a sausage casing by a sliding loop.

Apparatus according to the prior art serving this purpose close sausage casings by clamped on metal clips, or by a special yarn wound about a constricted portion of the sausage casing. However, the machines of the prior art are incapable of producing a loop for hanging up the sausage. Therefore, sausage casings are generally manually tied with a special yarn which is wound about a constricted portion of the casing and firmly tied. In a second operation, precut yarn lengths are manually attached and knotted to form a loop for hanging the sausage.

Casings for small sausages are supplied to the sausage maker with one end tied. This end is pleated and constricted and tied by a machine. The ends of the yarn do not form a loop, because such an operation cannot be carried out by the machines of the prior art. Consequently, after the filling of the casing with sausage meat, not only the open end has to be tied and provided with a hanging loop, but also the pretied end has to be provided with a loop in a manual operation.

It is one object of the invention to overcome the disadvantages of the known apparatus for typing containers, such as sausage casings, and to provide an apparatus which automatically ties constricted portions of the container or casing in such a manner that a loop for hanging up the filled container or sausage is automatically formed.

Another object of the invention is to provide a clip which, when bent and tied about a constricted container or casing portion, forms a loop suitable for hanging the filled container or sausage.

Another object of the invention is to provide apparatus eliminating manual operations in the tying of sausage casings.

While in accordance with the sausage filling operations of the prior art, a sausage casing is first filled by one operator, and then tied by a second operator, the apparatus of the present invention can be operated by the person stuffing the sausage by placing the stuffed casing on the machine, which applies the required clip, so that the stuffing of the next sausage casing can be started without delay.

Consequently, it is another object of the invention to produce sausages in a more economical manner by reducing the number of persons required for the manufacture of sausages.

In accordance with the invention, an endless clip consisting an endless wire of a synthetic material is automatically formed into a sliding loop, from which a free loop projects which can be used for hanging the sausage. The clip has a pair of parallel lateral portions connected by curved end portions, and when one end portion passes through the central opening of the endless clip, the sliding loop is formed which can be reduced until a constricted portion of the casing is tightly closed. The clip has undercut teeth engaged by an edge of the clip end portion when the loop is tied, so that the tightened loop is locked and cannot open.

The apparatus of the invention forms a sliding loop of the endless clip and tightens the same.

With the above objects in view, one embodiment of the invention comprises positioning means for placing an endless elongated clip on a portion of a container, such as a sausage casing; and operating means for first forming at one end of the endless clip a sliding loop surrounding the container portion, and for then tightening the loop. The tightened loop constricts and closes the container portion, while the other end of the endless clip forms a free loop for hanging up the container, or finished sausage. The teeth on the clip lock the tightened loop, so that the size of the free hanging loop cannot change.

In the preferred embodiment of the invention, a magazine contains a stack of endless clips consisting of a synthetic plastic material and being adhesively connected to each other. A slide closes the lower end of the magazine and preferably includes a cutting means for cutting or slicing individual clips from the stack. The positioning means includes feeding means which move the separated clip to the support where the portion of the container or casing which is to be tied is located. The feeding means includes bending means in the form of levers which receive the separated clip and bend the same over a pair of lips so that one end portion of the clip is located opposite the central opening between the lateral portions of the clip.

The operating means include a needle which is reciprocated to catch one end portion of the clip and to draw the same through the central opening so that a sliding loop is formed which is tightened about the container portion surrounded by the sliding loop as the needle is further withdrawn. As explained above, the tightened loop is locked, and cannot open again. Preferably, the clip has other teeth which bite into the constricted container portion so that turning of the tightened loop on the constricted container portion is not possible.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings, in which:

FIG. 3 is a vertical sectional view taken on line 3—3 in FIG. 4 and illustrating an embodiment of the invention;

FIG. 4 is a plan view of the illustrated embodiment;

FIG. 5 is a perspective view illustrating a clip in a final position forming a locked loop;

Figure 6:
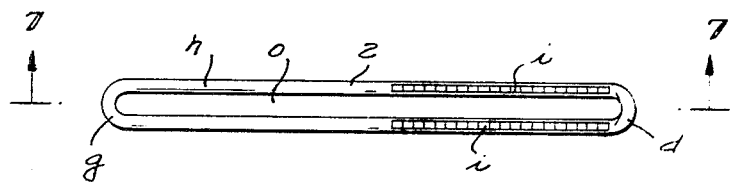
FIG. 6 is a plan view of a clip.
Figure 7:
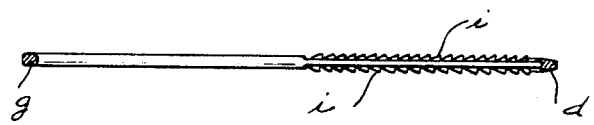
FIG. 7 is a sectional view taken on line 7—7 in FIG. 6.

Referring now to the drawings, a tubular magazine 1 contains a stack of adhesively connected clips 2 whose shape is best seen in FIGS. 6 and 7. Each clip 2 is an endless band and consists of a pair of parallel lateral portions h and a pair of curved end portions d and g. In the initial condition each clip is planar, and the lateral portions are straight. Two sets of sawtooth-shaped teeth i project from the top and bottom faces of the endless band at right angles to the plane of the same, as best seen in FIG. 7. The curved end portion d is angular, and preferably trapezoidal, so that a sharp edge d' is formed on end portion d which engages a tooth e when a loop is formed of the clip, as will be explained hereinafter.

The open end of magazine 1 is normally closed by a slide 38 including a closure plate 40 and a cutting knife 21 which defines with closure plate 40 an opening 42 which normally is located outward of the open end of the magazine. Slide 38 is guided between guide plates 39, and is operated by a member 45 which moves in the direction of the arrow 41 when discharge of a clip is desired. In this event, cutter 21 will separate the lowest clip 2 from the stack so that the clip slides through the opening 42 while closure plate 40 gradually opens the lower end of magazine 1.

Figure 2:
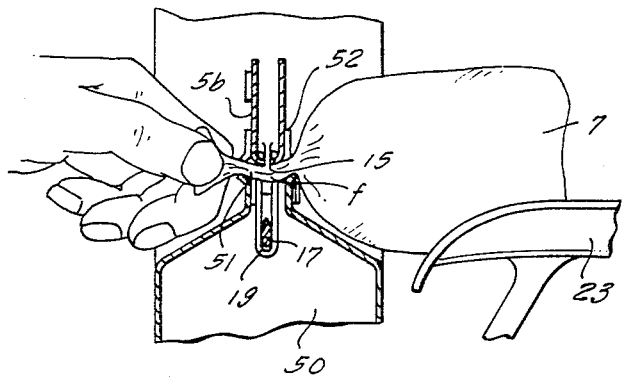
FIG. 2 is a fragmentary sectional view taken on line 2—2 in FIG. 1.

As shown in FIG. 2, a stuffed sausage casing 7 is pleated at one end and forms a projecting empty portion f which is placed by the operator at the bottoms of a pair of recesses 51 formed, respectively, by pairs of projections 52 of a supporting structure 50.

Feeding means are provided for feeding separated clips successively to a position located on the casing portion f. A carrier 5 is mounted on a pivot 5a on supporting means 50 for angular movement between the clip receiving position 5 shown in solid lines in FIG. 1, and the clip delivering position 6 shown in broken lines.

Levers 55 and 56 are mounted on carrier 5 for turning movement and are connected to each other by a link 11. Lever 56 is pivotally connected with an arm 12 which is mounted on a pivot 12a on supporting means 50.

Levers 55 and 56 support, respectively, angular levers each of which has a pair of transverse arms 13 and 22.

Figure 1:
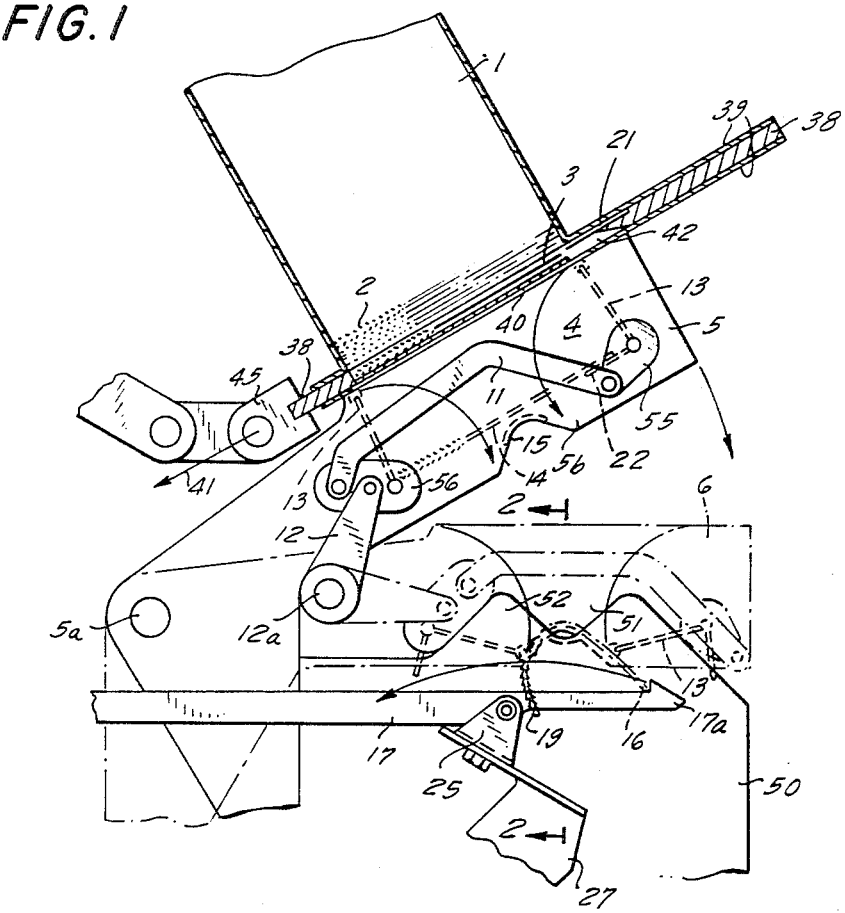
FIG. 1 is a fragmentary partially sectional view illustrating details of FIG. 3 on a larger scale.

In the position shown in solid lines in FIG. 1, actuating arm 12 holds lever 56, and through link 11 also lever 55 in the position illustrated in solid lines in which arms 13 project toward the magazine, and arms 22 are positioned to receive a single clip 14 separated by cutting means 21 from the stack of clips in magazine 1.

When carrier 5 is moved to the lower position 6, actuating arm 12 is turned about pivot 12a, and turns lever 56, and thereby also lever 5 to the position shown in broken lines so that arms 13 turn in opposite directions toward each other and arms 22 release clip 14 so that the same is positioned on a pair of inwardly projecting curved convex lips 15 on a pair of wall portions 5b of carrier 5.

During further movement of carrier 5, the position 6 is assumed in which arms 13 have turned further toward each other to bend the clip over lips 15 so that the end portions of the clip assume positions 16 and 19. End portion 16 is now located opposite the central opening o, see FIG. 6, and can be engaged by the hook 17a of a needle 17 in the position of FIG. 1 in which needle 17 passes through opening o.

Needle 17 has a rear end pivotally connected to an arm 36 which is mounted on a shaft for free turning movement. The shank of needle 17 is pivotally mounted on brackets 25 on a lever 27.

As best seen in FIG. 3, lever 27 is mounted for turning movement about a stationary shaft 28 and carries a cross member 29 acting on a pair of springs 20 when lever 27 is turned. Springs 20 abut a plate on a member 30 which is also mounted for turning movement on shaft 28. Member 30 has a cam follower roller 31 cooperating with a cam 24 driven by shaft 26a which also drives another cam 26, cooperating with a cam follower roller 5c on the lower arm 5d of carrier 5. A spring 18 is mounted in a stationary cylinder and connected by an articulated link to member 30 for urging cam follower roller 31 against the periphery of cam 24. A spring 8 acts on arm 5d to urge cam follower roller 5c into engagement with the periphery of cam 26. The movement is dampened by a piston 9 moving in a cylinder 10 and displacing air in the same through throttle openings so that carrier 5 cannot move to position 6 at an excessive speed when roller 5c arrives at the end of the peripheral cam track of cam 26.

A lever 34 is mounted on shaft 37 for free turning movement and has at its end a link articulated to the arm 43 of an angular lever which is mounted on the supporting means of turning movement about its pivot 44, and has another arm connected by a link to member 45 and tto slide 38. Consequently, cam 24 will operate slide 38 in timed relation with the operation of needle 17 which is controlled by cam follower 31, and since cam 26 is also fixed on shaft 26a, the movement of the feeding means 4 which include the carrier 5 and the bending lever means 13 between the clip receiving position and the clip delivering position 6 takes place also in timed relation with the reciprocation of slide 38 and of needle 17.

Needle 17 is mounted on brackets 24 not only for turning movement, but also adjustably in longitudinal direction so that the catching of clip end portion 16 in the position of FIG. 1 is assured. Springs 20 are also adjustable to provide a predetermined force acting on the needle in accordance with the diameter and mechanical properties of casing portion f of casing 7.

Supporting table 23 is provided with a switch, not shown, which is actuated when a sausage is placed on supporting table 23. The switch actuates an electromagnetic coupling, not shown, connecting shaft 26a with a motor, not shown, so that the operation is started by placing a sausage on support table 23. When shaft 26 has completed one revolution, a switch, not shown, in the circuit of the electromagnetic coupling means is actuated by cam 24 so that the machine is stopped.

When the machine is started, the feeding means 4, including carrier 5 and bending means 13, 15 are in the illustrated higher position. Cam 24 has previously operated lever 34 through cam follower 35 so that slide 38 was displaced in the direction of the arrow 41 in FIG. 1 and has cut the lowest clip 2 from the stack so that the clip gradually passed through opening 42 while closure plate 40 gradually opened the lower end of magazine 1. The completely separated clip 2 drops on arms 22 of bending levers 13 which are in a holding position supporting the clip in the position 14.

The machine is now started, and cam 24 turns to a position in which cam follower roller 5c moves from the peripheral cam track to the radial shoulder of cam 26 under the action of the force of gravity and of spring 8, the speed of the angular displacement of carrier 5 being limited by the damping means 9, 10.

During the movement of carrier 5, actuating arm 12 turns levers 56 and 55 so that the bending levers 13 also begin to turn together with the holding arms 22 which at the right moment release clip 14 so that the same lies on the inwardly projecting lips 15 between walls 5b of carrier 5. During further downward movement of carrier 5, bending arms 13 turn inward and engage the clip on opposite sides of lips 15, bending the clip to a substantially U-shaped form in which the end portion 16 is located in the plane of needle 17, and opposite the central opening o in the other end portion 19 of the clip.

At this moment, cam follower roller 31 arrives at the radial shoulder 33 of cam 24 so that roller 31 is moved rapidly inward by spring 18 and causes turning of members 30 and 27 in clockwise direction as viewed in FIG. 3 about shaft 28 so that needle 17 is rapidly advanced in a forward stroke and passes first through the central opening at the end 19 of the bent clip, and then catches the end portion 16.

Figure 8:
FIG. 8 is a fragmentary sectional view illustrating a tightened and locked loop surrounding a constricted casing portion.

During further rotation of cam 24, roller 31 is again moved outward, and members 30 and 27 turn in counterclockwise direction to retract the needle in a return stroke so that the hook 17a draws end portion 16 through the central opening in the bent clip whereupon end portion 19 slips over hook 17a whereby a loop surrounding constricted casing portion f is formed. Further movement of needle 17 to the left as viewed in the drawing results in tightening of the sliding loop until portion f is completely constricted by the tightened sliding loop in the position of FIG. 8.

The edge d' of end portion d of the clip snaps behind the undercut edge of a tooth e so that the tight loop is locked and cannot open. Cam 26 causes the needle to make a slight forward movement so that hook 17 releases end portion 16. The clip has now the shape shown in FIG. 5, and the greater part of lateral portions h and end portion d or 16 form a free loop which can be used for hanging up the sausage.

When needle 17 releases the clip, cam 26 acts on roller 5c to turn carrier 5 with bending means 13, 15 in counterclockwise direction to the higher position located in the region of the magazine, while actuating arm 12 turns the bending lever system 13, 55, 56, 11 back to the position shown in FIG. 1. When carrier 5 is in the higher receiving position, cam 24 actuates roller 35 and lever 34 to shift slide 38 so that the next clip is cut off from the stack and drops onto the holdings arms 22 of levers 13 so that the machine stops in a position ready for the next operation.

The tied sausages slide down a chute to a receiving table on which the sausages are deposited with the newly formed loops projecting all to the same side so that a cord can be threaded through the free loops, or the loops used for hanging up the sausages.

The clips may be prefabricated, or an extrusion press producing the clips of a synthetic plastic material can be disposed directly above the magazine 1 for supplying clips to the same.

It is advantageous to stagger the teeth on the top and bottom faces of the clips to assure biting of one set of teeth into the constricted casing portion f while a tooth e of the other set is locked by the edge d' of the end portion d.

It will be understood that each of the elements described above, or two or more together, may also find a useful application in other types of machines for tying the ends of containers differing from the types described above.

While the invention has been illustrated and described as embodied in an apparatus for tying constricted portions of a sausage casing by a locked loop formed of an endless toothed clip, it is not intended to be limited to the details shown since various modifications and structural changes may be made without departing in any way from the spirit of the present invention.

What is claimed as new and desired to be secured by Letters Patent is:

1. Tying apparatus for a container, such as a sausage casing, comprising, in combination, magazine means for a plurality of endless elongated clips; positioning means including supporting means for supporting a portion of said container, and feeding means movable between a first position for taking a single clip from said magazine and a second position for placing said clip on supported container portion; and operating means for first forming of said endless clip a sliding loop surrounding said container portion, and for then tightening said sliding loop so that said container portion is constricted and a free loop for hanging said container projects from said sliding loop.

2. Apparatus according to claim 1 wherein said feeding means including a movable carrier, and bending means on said carrier for bending said clip partly over said portion of said container so that one portion of said clip is located opposite the central opening of said endless clip; and wherein said operating means include a reciprocable member operable to pass through said central opening in a forward stroke to a position for engaging said one portion of said clip, and in a return stroke for pulling said portion through said central opening whereby first said sliding loop is formed and then said loop is tightened.

3. Apparatus according to claim 2 wherein said bending means include a pair of curved lips on said feeding means for supporting said clip, and a pair of bending members controlled by said feeding means during movement of the same between said first and second positions to move to a bending position engaging two portions of the clip on opposite sides of said curved lips for bending said clip over said lips into a substantially U-shaped form in which said one portion of said clip is located opposite said central opening.

4. Tying apparatus according to claim 1 comprising means for dampening the movement of said feeding means between said positions of the same; and adjusting means for adjusting said dampening means and thereby the speed of movement of said feeding means.

5. Apparatus according to claim 1 wherein said operating means include a reciprocable needle, actuating means for moving said needle in a forward stroke for catching said clip, and resilient means for moving said needle in a return stroke for first forming said sliding loop and for then tightening said sliding loop about said container portion.

6. Apparatus according to claim 5 and including adjusting means for adjusting the forward catch position of said needle, and means for adjusting said resilient means.

7. Tying apparatus for a container, such as a sausage casing, comprising, in combination, magazine means for holding a stack of endless elongated clips; supporting means for supporting a container portion; feeding means movable between a receiving position for receiving a single clip from said magazine, and a delivering position for placing the clip on said supported container portion and including bending means for bending the clip during movement of said delivering position into a substantially U-shaped form so that the clip embraces said container portion; needle means mounted on said supporting means for reciprocating movement in a forward stroke through the central opening of the bent clip to a position engaging one end portion of the same, and in a return stroke for first drawing the engaged end portion through said central opening so that a sliding loop is formed at one end of the clip surrounding said container portion, and for then tightening said sliding loop about said container portion so that the same is constricted, said endless clip having teeth engaging said one end portion when the loop is tight so that said loop is locked and the other end portion of the clip forms a free loop for hanging the container; and actuating means for operating said feeding means and said needle means in timed relation.

8. Apparatus according to claim 7 wherein said feeding means include a carrier mounted on said supporting means for angular movement between said receiving and delivering positions; wherein said bending means comprise an articulated lever system including a pair of levers mounted on said carrier for movement between a holding position for holding a clip supplied in said receiving position from said magazine means and a bending position, said bending means further including a pair of curved lips on said carrier for supporting two lateral portions of the clip while said levers are in said bending position; and comprising an actuating member mounted on said supporting means for turning movement and conected with said lever system for moving said angular levers between said holding and bending positions during movement of said carrier from said receiving position to said delivering position.

9. Apparatus according to claim 8 wherein said magazine means comprise slide means operated by said actuating means for separating single clips from said stack so that separated clips drop onto said angular levers in said holding position while said carrier is in said receiving position.

10. Apparatus according to claim 9 wherein said actuating means include first rotary cam means and first cam follower means connected with said needle means for operating the same; second rotary cam means and second cam follower means connected with said slide means for operating the same; and a drive shaft driving said cams.

11. Apparatus according to claim 9 wherein said slide means include cutting means for cutting single clips from said stack.

12. Tying apparatus for a container, such as a sausage casing, comprising, in combination, positioning means including a pair of curved lips for supporting an elongated endless clip, and means for bending said endless clip over said curved lips and partly over a portion of said container to a substantially U-shaped form in which one portion of said clip is located opposite the central opening in said endless clip; and operating means reciprocable through said central opening for engaging said one portion and for drawing the same through said central opening whereby a sliding loop is formed, and for then tightening said sliding loop so that said container portion is constricted and a free loop for hanging said container projects from said sliding loop.

References Cited
UNITED STATES PATENTS 3,318,623   5/1967   Barroso _____ 289—18 X THERON E. CONDON, Primary Examiner NEIL ABRAMS, Assistant Examiner U.S. Cl. X.R.
289—18; 229—65